United States Patent
Mannby

(10) Patent No.: US 10,901,524 B2
(45) Date of Patent: Jan. 26, 2021

(54) MITIGATING UNINTENTIONAL TRIGGERING OF ACTION KEYS ON KEYBOARDS

(71) Applicant: Microsoft Technology Licensing, LLC, Redmond, WA (US)

(72) Inventor: Claes-Fredrik U. Mannby, Mercer Island, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 17 days.

(21) Appl. No.: 16/255,336

(22) Filed: Jan. 23, 2019

(65) Prior Publication Data

US 2020/0233500 A1 Jul. 23, 2020

(51) Int. Cl.
*G06F 3/023* (2006.01)
*G06F 3/0488* (2013.01)

(52) U.S. Cl.
CPC ........ *G06F 3/0233* (2013.01); *G06F 3/04886* (2013.01)

(58) Field of Classification Search
CPC ..... G06F 3/0233; G06F 3/04886; G06F 3/023
See application file for complete search history.

(56) References Cited

U.S. PATENT DOCUMENTS

| | | | |
|---|---|---|---|
| 7,151,530 B2 | 12/2006 | Roeber et al. | |
| 8,010,895 B2 | 8/2011 | Chen | |
| 8,281,041 B2 | 10/2012 | Butterfield | |
| 9,043,725 B2 | 5/2015 | Wakefield et al. | |
| 2008/0120437 A1* | 5/2008 | Butterfield | G06F 3/0233 710/5 |
| 2009/0309768 A1 | 12/2009 | Pihlaja | |
| 2012/0113028 A1 | 5/2012 | Marsden et al. | |
| 2013/0328791 A1 | 12/2013 | Weksler et al. | |
| 2014/0198046 A1* | 7/2014 | Roskind | G06F 3/03547 345/168 |
| 2016/0357281 A1* | 12/2016 | Fleizach | G06F 3/04883 |

OTHER PUBLICATIONS

Trewin, Shari, "Keyboard Optimizer User Guide", Retrieved <<https://researcher.watson.ibm.com/researcher/view_group_subpage.php?id=1236>>, Aug. 10, 2005, 5 pages.

* cited by examiner

*Primary Examiner* — Rodney Amadiz
(74) *Attorney, Agent, or Firm* — Fiala & Weaver P.L.L.C.

(57) ABSTRACT

A system is described that mitigates the unintentional triggering of action keys on keyboards. The system detects and interprets first and second keyboard input events. If the first keyboard input event is interpreted as a character input and the second keyboard input event is interpreted as an action input, the system performs a pattern analysis based at least on an elapsed time between the first and second keyboard input events. If the second keyboard input is determined to be unintentional, the system may mitigate the unintentional triggering of the second keyboard input event by ignoring it or by interpreting the second keyboard input event as something other than the action input. If the second keyboard input is determined to be intentional, then the second keyboard input is accepted as the action input.

20 Claims, 6 Drawing Sheets

700

702

Determine that the second keyboard input event is not a result of an unintentional user keystroke or keystrokes in response to: detecting a third keyboard input event that is subsequent to the second physical keyboard input event and is also interpreted as the action input; or determining that a duration of the second keyboard input event exceeds a predetermined amount of time.

Disable a subsequent performance of at least the performing step based at least on: a user input context; or determining that a typing speed of a user is less than a predetermined speed.

FIG. 8

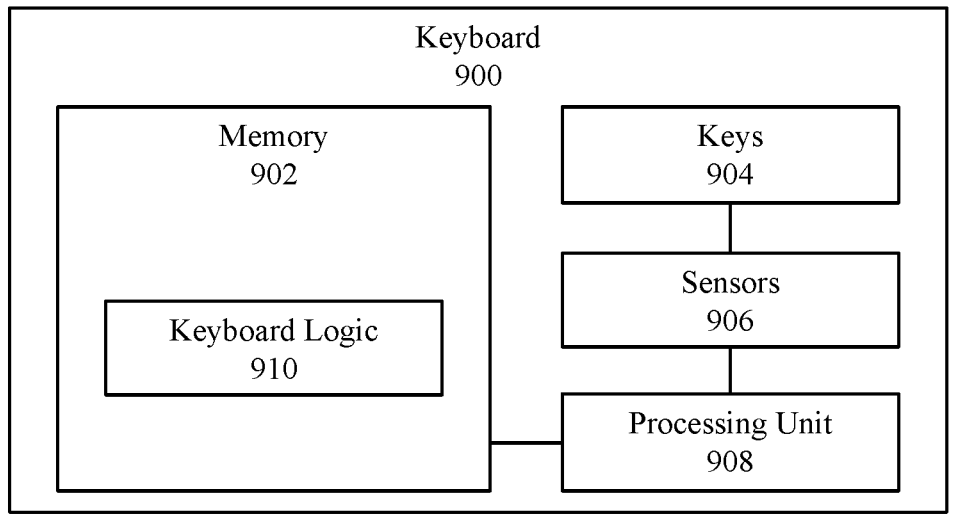

FIG. 9

MITIGATING UNINTENTIONAL TRIGGERING OF ACTION KEYS ON KEYBOARDS

BACKGROUND

Computing devices with many different form factors are now being produced, including devices with smaller form factors, for example, tablets, mini laptops, and notebooks. Some of these smaller form factor devices have smaller keyboards with smaller keys more densely packed into a tighter space. This can make it easier for the user to make typing mistakes, and easier for the user to accidentally hit certain action keys or action key combinations. Keys that may be used as action keys, which are typically on the periphery of a keyboard, such as Tab, Caps Lock, Shift, Ctrl, or Alt, are easier to strike on the smaller keyboard as they are closer to the user's fingers. Action key combinations may be any combination made by pressing and holding several keys, including at least one action key, simultaneously or in sequence. An example of an action key combination includes a combination of an action key (Ctrl) and a letter key (M).

Accidental typing of action keys or action key combinations while touch-typing on a keyboard may trigger unwanted disruptions. For example, triggering of an action key or action key combinations may change the state of a graphical user interface (GUI) or document currently being displayed on a corresponding device, or trigger an unwanted operation, for example, autocorrection or sending an email. Another potential by-product of accidental striking of action keys or action key combinations is that the intended characters are lost because, rather than the characters being input, an unwanted action was triggered. Thus, the user thus has to re-type the lost characters.

Some virtual keyboards (keyboards that may appear on a touchscreen of a computing device) attempt to avoid the aforementioned key size/density issue by providing multiple keyboard layouts, each layout being dedicated to a different type of character or mark, such as letters, numbers, symbols, and punctuation marks. With such virtual keyboards, the user can make a deliberate mode switch to access the desired character or mark in a particular keyboard layout. Unlike virtual keyboards, physical keyboards cannot be morphed into different keyboard layouts with a simple mode switch to address the key size/density issue. In a small physical keyboard, all the necessary keys must fit in a physical space that is smaller than a standard-sized keyboard, leading to more typing errors. Virtual keyboards may also have on-screen guidance to aid the user with respect to the key the user is about to press. However, physical keyboards cannot provide such on-screen guidance to the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system is described herein that mitigates the unintentional triggering of action keys on keyboards. The system detects and interprets a first keyboard input event and a second keyboard input event. If the first keyboard input event is interpreted as a character input and the second keyboard input event is interpreted as an action input, the system performs a pattern analysis based at least on an elapsed time between the first and second keyboard input events. If the second keyboard input is determined to be unintentional, the system may mitigate the unintentional triggering of the second keyboard input event by ignoring it or by interpreting the second keyboard input event as something other than the action input. However, if the second keyboard input is determined to be intentional, then the second keyboard input is accepted as the action input.

Further features and advantages of various embodiments, as well as the structure and operation of the various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 7 depicts a flowchart of a method for determining that a keyboard input event is intentional, according to an example embodiment.

FIG. 8 depicts a flowchart of a method for disabling mitigation measures, according to an example embodiment.

FIG. 9 is a block diagram of a keyboard for mitigating unintentional triggering of action keys or action key combinations, according to an example embodiment.

Figure 1:
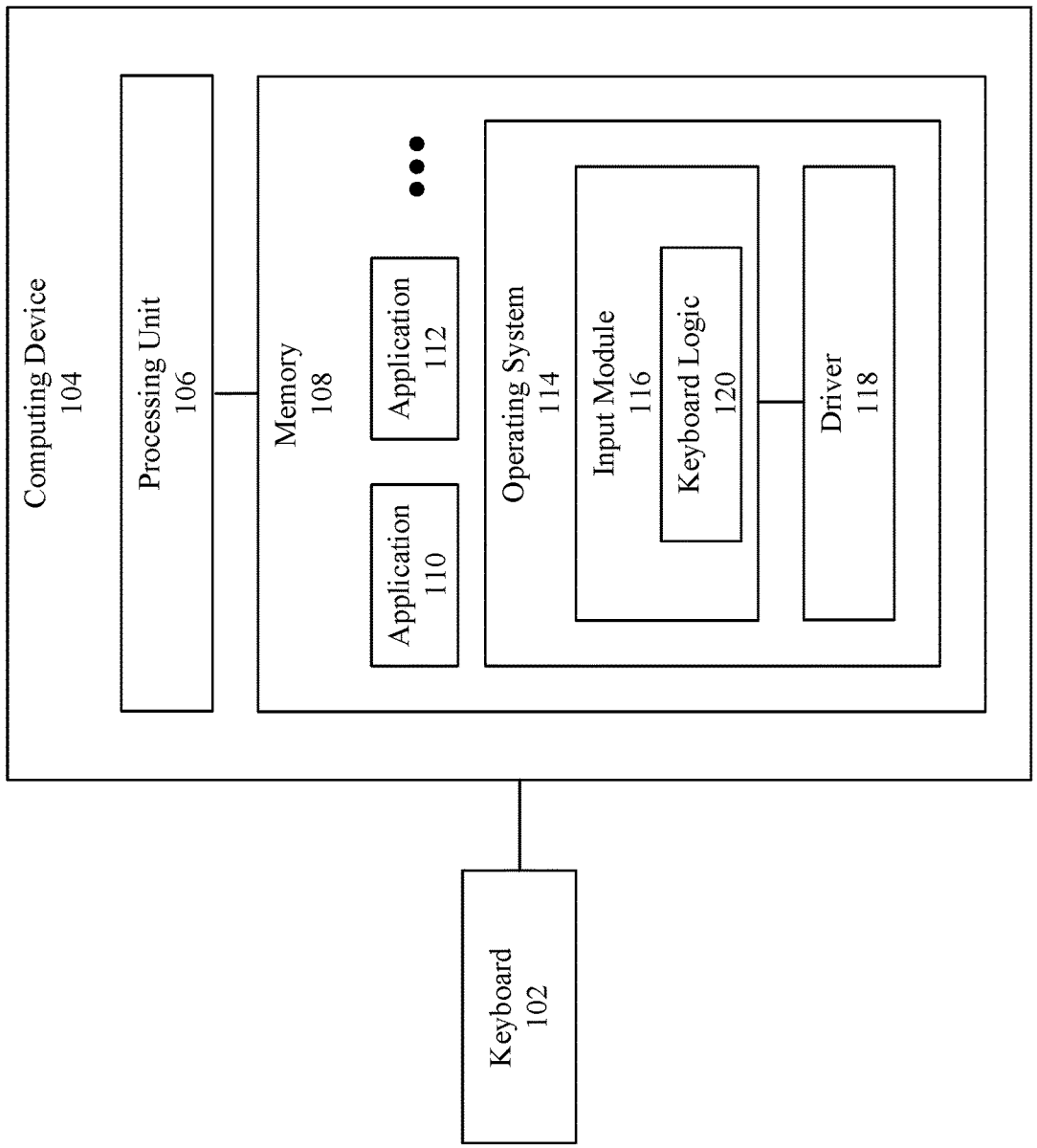
FIG. 1 is a block diagram of a system that includes a keyboard and a computing device, according to an example embodiment.

The features and advantages of the various embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Throughout the specification, the term "physical keyboard input" may refer to an input from a physical keyboard that is communicatively coupled to a computing device. In contrast, the term "keyboard input" may refer to either an input from a physical keyboard or an input from a virtual, non-physical keyboard.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below will describe example embodiments for mitigating unintentional triggering of action keys or action key combinations on keyboards. In particular, sub-section A of Section II describes an example system embodiment, sub-section B of Section II describes example method embodiments, and sub-section C of Section II describes an example standalone keyboard embodiment.

Section III below will describe an example processor-based computer system that may be used to implement features of the embodiments described herein. Section IV below will describe some additional example embodiments. Section V will provide some concluding remarks.

II. Example Embodiments for Mitigating Unintentional Triggering of Action Keys or Action Key Combinations on Keyboards A small form factor computing device, for instance, a Microsoft® Surface® device, may include a physical keyboard that is smaller than a typical computer keyboard. With such a small keyboard, due to the relatively small size and greater density of the keys, it may be easier for the user to make typing errors. This problem may be exacerbated for a touch-typist who is typing rapidly with both hands without looking at the keyboard. It may be quite easy for the user to inadvertently strike certain action keys on the periphery of the keyboard that may be very disruptive when unintentionally triggered.

As used herein, the term "character keys" generally refers to keys or key combinations that are activated by a user to input characters. Character keys may include, for example, letter keys (A-Z) and number keys (0-9). In contrast, as used herein, the term "action keys" generally refers to keys or key combinations that are activated by a user to perform operations, change a context, or navigate/alter a GUI. During normal typing, the action keys may be used less frequently than character keys.

As noted above, action keys may include keys and key combinations that trigger operations, change a context, or navigate or alter a GUI in some manner. On a conventional keyboard, the Tab, Caps Lock, Shift, Ctrl, Fn, Windows, Shift, Alt keys, etc., may typically be used as action keys. For example, pressing the Windows key may open the Start menu for a Windows® operating system. Certain punctuation keys, such as the bracket key or colon key, may also be configured to act as action keys. For instance, the close square bracket (]) may be designated as a word breaker or token terminator. Such a word breaker or a token terminator signals the end of a word and may trigger an action that would normally be performed when the end of the word is reached even when the word has not been typed in its entirety, such as an autocorrect operation. In this example, when the word breaker key is accidentally triggered, the keystroke input flow is interrupted. If the user is not done typing a particular word but the system interprets that the word is complete because of the word breaker, the system may perform an autocorrect operation and replace the unfinished word with another word—possibly one that is not intended by the user. The user would then have to strike the backspace key a certain number of positions to correct the replaced word because it was misinterpreted.

Action key combinations may include any combination formed by pressing and holding several keys simultaneously or in sequence to trigger an operation, change a context, or navigate/change a GUI in some manner. Action key combinations may include an action key and one or more other action or non-action keys. An example of an action key combination includes the simultaneous pressing of Ctrl and M, which may have the same effect as the Enter key, may trigger a Send operation, or may cause a context change with a Tab formatting action.

Accordingly, the unintentional triggering of action keys or action key combinations is disruptive as it can trigger an operation, change a context, or navigate/change a GUI in some manner. Furthermore, such unintentional triggering of action keys or action key combinations may interrupt the input flow and require the user to spend time and effort to remediate the unwanted effects. Embodiments described herein help to mitigate the aforementioned unintentional triggering of action keys and action key combinations on keyboards, especially small physical keyboards. Certain mitigation mechanisms described herein automatically perform a pattern analysis to determine whether an action input is intentional based at least on an elapsed time between two consecutive keystrokes, wherein the first keystroke is interpreted as a character input and the second keystroke is interpreted as the action input. If the action input is deemed to be intentional, that action input is accepted as typed. If the action input is determined to be unintentional, the input may be ignored or may be interpreted as another, more likely input. Thus, this mitigation technique improves the functioning of the keyboard and the associated computing device by providing a more accurate and efficient keyboard input method, which also improves the user experience.

A. Example System Embodiment

Mitigating unintentional triggering of action keys or action key combinations on keyboards may be enabled in various ways in embodiments. For instance, FIG. 1 is a block diagram of a system 100, according to an example embodiment. As shown in FIG. 1, system 100 includes a keyboard 102 that is connected to a computing device 104 that includes a processing unit 106 and a memory 108. System 100 is described as follows.

Keyboard 102 is an input device that includes a plurality of user-actuatable components, such as buttons or keys with marks engraved or printed on them, such as letters (e.g., A-Z), numbers (e.g., 0-9), punctuation marks (e.g., a comma, a period, a hyphen, brackets, slashes), symbols (e.g., @, #, $) and specialty keys that may be associated with actions or act to modify other keys (e.g., Caps Lock, Fn, Shift, arrow keys). The keys may comprise sensors or switches, the actuation of which may be interpreted as signals that may be provided to computing device 104. Each key may be associated with a key code or scan code based on its position on keyboard 102. Moreover, any change in state of the sensors, such as the pressing, repeated pressing, holding or releasing of the keys on keyboard 102, may generate one or more key codes. For example, the pressing of the Esc key may produce key code 01, and the releasing of the Esc key may produce key code 81. If the Esc key is pressed twice, key code 01 may be registered twice, for example. Key codes sensed by keyboard 102 may be transmitted to computing device 104 as sensed. The key codes may also be translated, via a lookup table for example, to a set of output key codes (e.g., Universal Serial Bus codes) before being transmitted. The key codes may be saved at keyboard 102 before being transmitted as a series of key codes in a data stream. Computing device 104 may also repeatedly poll keyboard 102 to detect state changes of the keys as keyboard input events.

Keyboard 102 may be configured to receive commands from computing device 104. Keyboard 102 may also include a processor, memory and routing circuitry. Keyboard 102 may be implemented as a mechanical-switch keyboard, a buckling-spring keyboard, a Hall-effect keyboard, a laser projection keyboard, a roll-up keyboard, an optical keyboard, or a keyboard using other keyboard technologies. Depending on the implementation, keyboard 102 may be integrated within the same physical structure or housing as computing device 104 or may be in a physically separate structure or housing with respect to computing device 104 and connected thereto via a suitable wired and/or wireless connection.

Referring to FIG. 1, computing device 104 may be any type computing device, including a mobile computing device (e.g., a smart phone, a Microsoft® Surface® device, a laptop computer, a notebook computer, a tablet computer such as an Apple iPad™, a netbook, etc.), a smart television, a gaming console, or a stationary computing device such as a desktop computer or PC (personal computer). However, these examples are not intended to be limiting and persons skilled in the relevant art will appreciate that the techniques described herein could be broadly applied to any type of device that accepts input from a keyboard.

Computing device 104 and keyboard 102 may each include one or more wired or wireless interfaces to enables communication with each other and with other devices either in a peer-to-peer manner or over a network. Examples of such interfaces include a Universal Serial Bus (USB) interface, a Personal System/2 (PS/2) port, a Bluetooth™ interface, a near field communication (NFC) interface, an IEEE 802.11 wireless LAN (WLAN) wireless interface, a Worldwide Interoperability for Microwave Access (Wi-MAX) interface, an Ethernet interface, a cellular network interface, etc. Examples of a network over which such communication may occur include a local area network (LAN), a wide area network (WAN) such as the Internet, a personal area network (PAN), and/or a combination of communication networks.

Processing unit 106 of FIG. 1 is intended to represent one or more processing circuits. Processing unit 106 may comprise, for example, one or more microprocessors, each of which may include one or more central processing units (CPUs), or microprocessor cores. Processing unit 106 may also comprise a microcontroller, application-specific integrated circuit (ASIC), and/or field-programmable gate array (FPGA). Processing unit 106 may operate in a well-known manner to execute computer programs (also referred to herein as computer program logic). The execution of such computer programs may cause processing unit 106 to perform operations, including operations that will be described herein. Each component of computing device 104, such as memory 108, may be connected to processing unit 106 via one or more suitable interfaces.

Memory 108 comprises one or more volatile memory devices and/or nonvolatile memory devices. Memory 108 stores a number of software components, including a plurality of applications, such as application 110 and application 112, and an operating system 114. Each application 110 and application 112 comprises a computer program that a user of computing device 104 may cause to be executed by processing unit 106 to perform certain operations, wherein the type of operations to be performed may vary depending upon how the application is programmed. Application 110 and application 112 may comprise any type of application, including but not limited to a database application, an e-mail application, a productivity application, a social networking application, a messaging application, a financial services application, a news application, a search application, a productivity application, or the like. Although FIG. 1 shows two applications, any number of applications may be present at computing device 104 or accessible by computing device 104.

Operating system 114 comprises a set of programs that manage resources and provide common services for applications, such as application 110 and application 112, that are executed on computing device 104. Among other components, operating system 114 comprises an input module 116, which includes keyboard logic 120, and driver 118. Each of these components maybe executed by processing unit 106 to perform operations that will be described herein.

Driver 118 may be a keyboard driver, such as a universal serial bus (USB) driver configured to receive human interface device (HID) signals over a USB. Driver 118 may include files and programs that enable operating system 114 to recognize and/or process input data, such as key codes or output codes, received from keyboard 102. Thus, driver 118 may include or obtain information about the keys on keyboard 102 including specialty keys, keyboard layout, etc. Driver 118 may also return commands from computing device 104 for execution by a processing circuit within keyboard 102. Driver 118 may include logic that enables a user to program special function keys or change the keyboard layout. Driver 118 may also provide information about connection types for keyboard 102, such as USB, PS/2, or Bluetooth®. Driver 118 may also provide input data to input module 116.

Input module 116 includes computer program logic that enables processing unit 106 to process input data received via driver 118. Input module 116 may coordinate internal traffic and facilitate communication between processing unit 106 and any input devices (e.g., keyboard 102) coupled to computing device 104. Input module 116 may also buffer data since there may be a difference in data transfer rates to and from processing unit 104 and to and from external devices. Furthermore, input module 116 may detect, correct and/or report errors as they occur. In embodiments, input module 116 may be a standalone component or may be a part of an input/output module. Input module 116 includes keyboard logic 120.

Keyboard logic 120 includes computer program logic that may be executed by processing unit 106 to mitigate unintentional triggering of action keys or action key combinations on keyboard 102. Keyboard logic 120 will be further described below in connection with other figures, such as FIGS. 2 and 3. While keyboard logic 120 is depicted as being a part of input module 116 in FIG. 1, keyboard logic 120 may alternatively be a part of driver 118, some other part of operating system 114, or any application stored in memory 108, such as application 110 and application 112. In embodiments, keyboard logic 120 may also be a part of keyboard 102.

B. Example Method Embodiments

Figure 2:
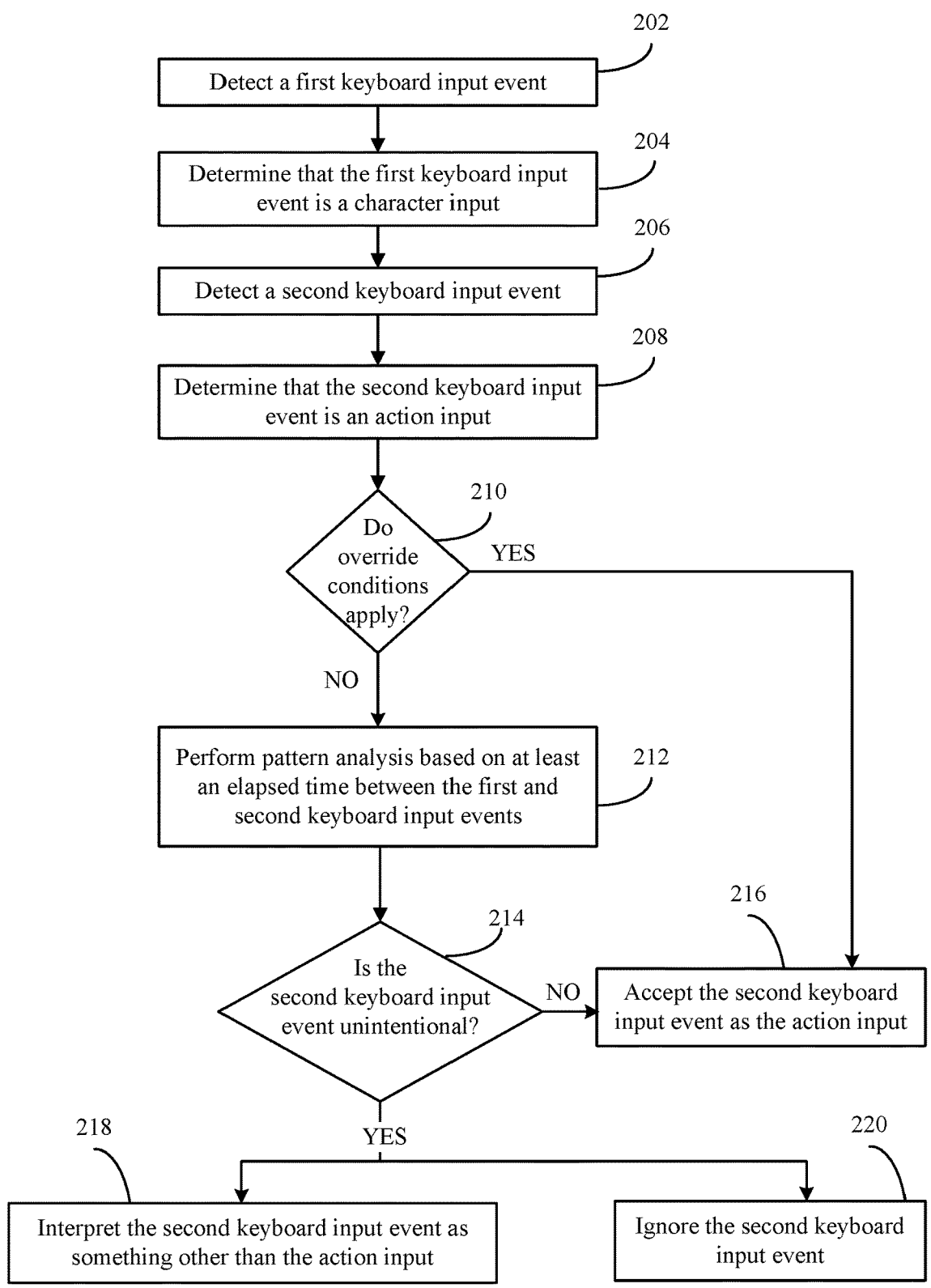
FIG. 2 depicts a flowchart of a method for mitigating unintentional triggering of action keys or action key combinations on a keyboard, according to an example embodiment.

The mitigation of unintentional triggering of action keys or action key combinations will now be described in more detail in reference to FIG. 2. In particular, FIG. 2 is a flowchart 200 of a method for mitigating unintentional triggering of action keys or action key combinations on a keyboard, in accordance with an embodiment. The method of flowchart 200 will now be described with continued reference to various components of system 100 of FIG. 1. However, the method is not limited to that embodiment.

As shown in FIG. 2, the method of flowchart 200 begins at step 202, in which a first keyboard input event is detected. This step may be performed, for example, by keyboard logic 120 of computing device 104, which operates to obtain input data from keyboard 102 via driver 118. As discussed above, input data from keyboard 102 may include, among other things, key codes that correspond to incoming keystrokes or key presses by a user. Accordingly, keyboard logic 120 may detect the first keyboard input event based on input data signifying a key press or a key release of a first key. Keyboard logic 120 may also detect the first keyboard input event based on input data signifying the pressing of a combination of keys.

At step 204, it is determined that the first keyboard input event is a character input. This step may be performed, for example, by keyboard logic 120 of computing device 104, which determines that the first keyboard input event corresponds to a character input. For example, keyboard logic 120 may access information obtained from keyboard 102 or elsewhere, about the keys and the keyboard layout for keyboard 102. Keyboard logic 120 may access a lookup table, for example, to translate from key codes or output codes to the corresponding characters. Thus, keyboard logic 120 may determine that a keyboard input event (e.g., the pressing or releasing of a key or a combination of keys on keyboard 102) is a character input with the information obtained from the lookup table. Character keys may include letters, numbers and other non-alphanumeric keys that include punctuation marks and other symbols. Examples of non-alphanumeric character keys include the open ([) and close (]) square bracket keys, the open ({) and close (}) curly bracket keys, the open (<) and close (>) angle bracket keys, the backward (\) and forward (/) slash keys, and the colon (:) and semicolon (;) keys. After keyboard logic 120 determines that the first keyboard input event is a character input, the method proceeds to step 206.

At step 206, a second keyboard input event is detected. This step may be performed, for example, by keyboard logic 120 of computing device 104, which operates to obtain input data from keyboard 102 via driver 118. As discussed above, input data from keyboard 102 may include, among other things, key codes that correspond to incoming keystrokes or key presses by a user. The second keyboard input event may be subsequent to the first keyboard input event. Thus, the key code(s) for the second keyboard input event may be subsequent to the first key code(s) that correspond to the first keyboard input event in a buffer and/or in transmission to computing device 104. The second keyboard input event may be a key press or a key release of a second key. The second keyboard input event may also be the pressing of a combination of keys.

At step 208, it is determined that the second keyboard input event is an action input. This step may be performed, for example, by keyboard logic 120 of computing device 104, which determines that the second keyboard input event corresponds to an action input. For example, keyboard logic 120 may determine that a keyboard input event (e.g., the pressing or releasing of a key on keyboard 102) is an action input based on accessed information (e.g., a lookup table). Of the plurality of keys on keyboard 102, some keys may be configured as character keys as mentioned above, and other keys may be configured as action keys. Action keys may trigger operations, change a context, or navigate/change a GUI in some manner. Examples of keys that may be configured to be action keys include Tab, Caps Lock, Shift, Ctrl, Fn, Windows, Shift, Alt, and the Space key. Depending on the keyboard design and/or the operating system, other keys may also be configured to be action keys. An action key press or release may be interpreted as an action key input event. Each action key may trigger one or more actions or operations, such as the pressing of the Windows key may open or hide the Start menu in a Microsoft® Windows® operating system. In launching or closing the Start menu, the GUI may be changed to show the opening or closing of the Start menu. Similarly, the triggering of the Menu key launches a context menu, a menu that is specific to the program currently being used or is dependent on the state and function of the location of the mouse cursor. In launching or closing the context menu, the context or state of the program to which the menu belongs may be changed to reflect the opening or closing of that context menu.

Some punctuation keys may also be configured to trigger an operation, and thus they may be considered action keys rather than just mere character keys. For example, the square bracket keys, the curly bracket keys, the quotation mark, the colon and semicolon keys may each be configured to be a word breaker or token terminator, the trigger of which signals the end of a word. For instance, in the word processing Microsoft® Word® program, a space may signal the end of a word, and thus triggers the autocorrect operation. As a specific example, when the word EXAMPLE is mistyped as EXAMPPLE, the autocorrect operation may automatically be triggered after the space key is struck to change the mistyped word to the correct form. Similarly, when EXAMPLE is mistyped as EXAMPPLE], the close square bracket serves as a word breaker that signals the end of the word, also triggering the autocorrect operation. Thus, for a touch-typist, it may be very disruptive to be typing a series keystrokes and then accidentally strike a word breaker, triggering an autocorrect operation prematurely that may need more time and effort to fix than simply just striking the backspace key once to delete the unintended character. This is because in performing autocorrection on an incomplete word, such word may be misunderstood and thus the replaced word may be quite different from what the typist intended. To fix such issue, the typist might have to go back and delete the unintended character as well as re-type any character that was lost in the autocorrect operation. Thus, keyboard logic 120 may mitigate such unintentional triggering of action keys to provide a more accurate and efficient keyboard input method that leads to a better user experience.

In example embodiments, one and the same key may be considered a character input or an action input or both under different contexts. For example, at the beginning of a word or when used to enclose a word or a series of characters, punctuation keystrokes may be considered character inputs because they will not cause an autocorrect operation to occur in that context. As a specific example, if a user types a word within two square brackets, [EXAMPPLE], the square brackets may be interpreted as character inputs because there is no part of a token before the open square bracket to terminate and the close right bracket may be expected because of the open square bracket. Additionally, the close square bracket may also trigger an autocorrect operation on the alphabetical part of the token between the square brackets, and thus the close square bracket may be interpreted as both an action input and a character input in this context. In another example, when EXAMPPLE] is typed, the close square bracket may be interpreted as a token terminator or an action input rather than a character input in this context.

Furthermore, when an action key is triggered in combination with another key or keys, this forms an action key combination that may also be interpreted as an action input by keyboard logic 120. Accordingly, action key combinations may be treated the same as or similar to action keys in the process of mitigating unintentional keystrokes. The action key combinations may be triggered by a user pressing and holding several keys simultaneously or in sequence, the result of which may trigger operation(s), change a context, or navigate/change a GUI in some manner. For example, a combination of Ctrl and S may trigger the Save operation for a current document file. As another example, a combination of Ctrl and F may trigger a change in context with the opening of the Find window for a current program. As a further example, a combination of Ctrl, Shift, and Esc may trigger the opening of the Windows Task Manager, thereby causing a change in a GUI. As yet another example, a combination of Alt and M may activate a menu shown on the GUI of a word editor.

Returning to step 208, after keyboard logic 120 determines that the second keyboard input event is an action input, the method proceeds to step 210.

At step 210, it is determined whether override conditions apply. This step may be performed, for example, by keyboard logic 120 of computing device 104, which determines whether certain override conditions apply. For example, keyboard logic 120 may include information, specific rules or conditions for example, about when the mitigation of the unintentional triggering of action keys may be suppressed. These conditions or rules enable the user to override the mitigation process with the activation of at least one of the conditions or rules. An example override condition includes pressing and holding the second key or key combination that is interpreted as the second keyboard input for at least a predetermined amount of time. Such time amount may be configured by a user or system, and thus could be any suitable period of time, for example, an amount of time that is slightly longer than adequate to register a keystroke or a combination of keystrokes. Another example override condition includes deliberately pressing the second key or key combination multiple times. In this case, the first pressing of the second key or key combination may first be determined as unintentional and interpreted as something else other than the second keyboard input. However, upon detecting a second repeated pressing of the second key or key combination, keyboard logic 120 may negate the first interpretation and/or simply ignore it. For instance, the user wanting to trigger the Windows key immediately after typing a series of characters may press the Windows key once. However, this might activate the mitigation of unintentional triggering of the Windows action key, and thus the Windows key press may be ignored or interpreted as some other key adjacent to the Windows key. Instead, the user may press the Windows key twice in succession or press and hold the Windows key for a period of time (e.g., in the range of milliseconds) to signal that the Windows key press is intentional, thereby overriding any mitigation measure.

Other conditions may be used to override the mitigation process, for example, a particular key or key combination may be used to activate the override. Such a key or key combination may be set by the user or may be predetermined. In example embodiments, a new dedicated key may be utilized for the override operation. That dedicated key may cause a mode shift between a character input mode for typing characters, and an action input mode for entering action inputs. The dedicated key may be configured to operate as a modifier key, triggering either the character input mode or the action input mode when pressed. The dedicated key may alternatively be configured to be a toggle key that switches between the action input mode and the character input mode when pressed. In example embodiments, the dedicated key may be used to toggle between alternate keyboard layouts, which may be displayed on a screen of computing device 104 or key caps of keyboard 102 for mnemonic support, for example. If keyboard logic 120 determines that no override condition applies, then method 200 proceeds with step 212.

At step 212, a pattern analysis is performed based on at least an elapsed time between the first and second keyboard input events. This step may be performed, for example, by keyboard logic 120 of computing device 104, which performs the pattern analysis based at least on an elapsed time between the first and second keyboard input events. The pattern analysis includes an examination of a series of keyboard input events to determine whether a keyboard input event is a result of an unintentional keystroke or keystrokes. For example, the examination may include determining an elapsed time between the second keyboard input event and an immediate prior keyboard input event, the first keyboard input event, to determine whether the elapsed time exceeds a time threshold. Other information and statistics may be used in the pattern analysis, some of which will be described in connection with subsequent figures.

At step 214, it is determined whether the second keyboard input event is unintentional. This step may be performed, for example, by keyboard logic 120 of computing device 104, which may determine whether the second keyboard input event is unintentional based on results of the analysis at step 212. For example, if the elapsed time between the first keyboard input event and the second keyboard input event equals or exceeds the aforementioned time threshold then the second keyboard input event may be deemed intentional, otherwise the second keyboard input event may be deemed unintentional. The assumption underlying such an approach is that if a user is striking a series of character keys (e.g., letters and numbers) in a row, it is unlikely for the user to then immediately strike an action key or action key combination in that character input flow. Thus, if the elapsed time between a character input and an action input is shorter than the time threshold, then it is more likely than not that such action input is unintentional, and therefore mitigation measures may apply. If the elapsed time between an action input and a character input equals or exceeds the time threshold, then the action input is more likely to be deliberate and thus no mitigation measure is needed. At step 216, the second keyboard input is accepted as the action input. This step may be performed, for example, by keyboard logic 120 of computing device 104. The second keyboard input may be accepted as the action input based on the determination in step 214 that the second keyboard input event is intentional. In addition, the second keyboard input may also be accepted as the action input based on the determination at step 210 that one or more override conditions do apply. Thus, when keyboard logic 120 determines that override conditions apply as triggered by the user, or keyboard logic 120 determines through pattern analysis that the action input is intentional, the second keyboard input event is accepted as the action input. For example, when a series of character inputs is detected and is immediately followed by the Windows key input, and the time difference between the last of the series of characters and the Windows key is determined to be greater than the time threshold, the Windows key may be accepted as the action input. Similarly, after a plurality of character inputs are detected, and the Windows key is determined to have been pressed twice to indicate an override of the mitigation process, the Windows key input may be interpreted as intentional and accepted as typed.

At step 218, the second keyboard input event is interpreted as something other than the action input. This step may be performed, for example, by keyboard logic 120 of computing device 104. Keyboard logic 120 may determine logical alternatives to the action input based on information such as previous keystrokes, subsequent keystrokes, current context, known typing habit or tendency of a user, autocorrection rules, or functional nature and adjacency of keys surrounding the second key that corresponds to the second keyboard input. Other information or statistics may also be used to determine logical alternatives to the second keyboard input. Keyboard logic 120 may first determine a list of possible alternatives to the second keystroke, and then select from that list the best alternative as a replacement for the unintentional second keyboard input. Other selection schemes may also be used, for example, based on an order of the listing or randomly. The alternatives may be other character or action inputs. For example, if a Windows key press is determined to be an unintentional keystroke, then it may be replaced with the letter Z or X, whichever makes more logical sense as a replacement given the previous character inputs. As another example, if a key combination of Ctrl and the open square bracket ([) input is detected but is determined to be unintentional, that key combination may be replaced with Ctrl and P instead, since P is next to the open square bracket and has an associated function when combined with Ctrl to print a current page or document. As yet another example, after a copy operation has been performed in a document (e.g., a word has been selected and copied), and a key combination of Ctrl and Ins is detected and determined to be unintentional, that key combination may be replaced with the combination of Shift and Ins instead to trigger a paste operation. In this case, the combination of Shift and Ins is a viable alternative to Ctrl and Ins because of the current context that includes a previously performed copy operation.

At step 220, the second keyboard input event is ignored. This step may be performed, for example, by keyboard logic 120 of computing device 104. When keyboard logic 120 determines that a keyboard input is unintentional, keyboard logic 120 may simply ignore or reject the unintentional keyboard input and may proceed as if such keyboard input never occurred.

In embodiments, step 218 may be performed first, and if no possible replacement is found for the second keyboard input, then step 220 may be performed as the default step after step 220. In other embodiments, step 220 may be performed independently or instead of step 218 to simplify the mitigation process and/or to accommodate a user preference, for example.

Figure 3:
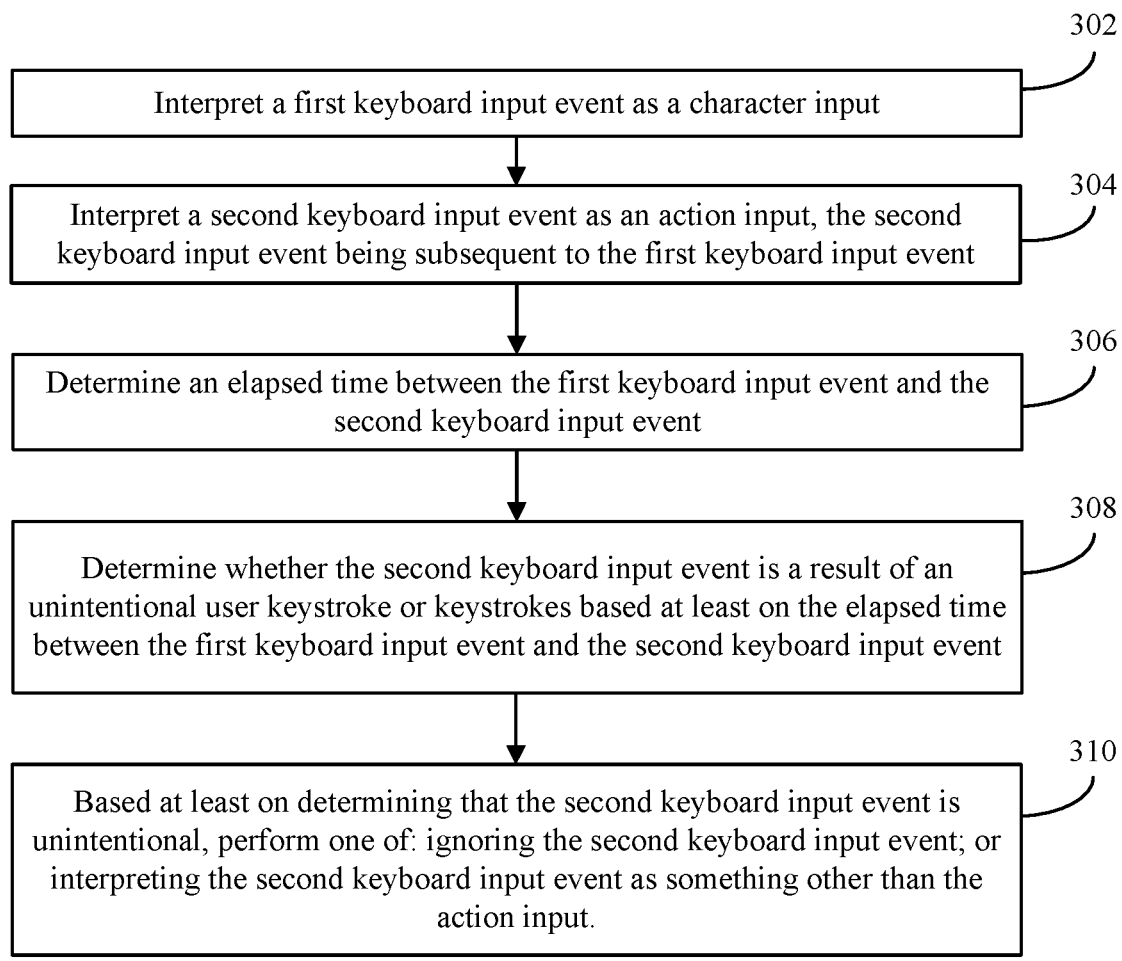
FIG. 3 depicts a flowchart of a method for mitigating unintentional triggering of action keys or action key combinations on a keyboard, according to another example embodiment.

According to example embodiments, methods for mitigating unintentional triggering of action keys or action keys combinations on keyboards are described herein. FIG. 3 shows a flowchart 300 of a method for mitigating unintentional triggering of action keys or action key combinations on a keyboard, according to an example embodiment. The method of flowchart 300 will now be described with continued reference to various components of system 100 of FIG. 1. In particular, each of the steps of flowchart 300 may be performed, for example, keyboard logic 120 of computing device 104. However, the method is not limited to that embodiment.

As shown in FIG. 3, the method of flowchart 300 begins at step 302, in which a first keyboard input event is interpreted as a character input. For example, keyboard logic 120 may operate to obtain input data from keyboard 102. As discussed above, input data from keyboard 102 may include, among other things, key codes that correspond to incoming keystrokes or key presses by a user. Accordingly, the first keyboard input event may be a key press or a key release of a first key, or a first key combination. Keyboard logic 120 may also interpret the first keyboard input event as a character input using stored information (e.g., a lookup table) or information obtained from another source, such as driver 118 of FIG. 1. This step is similar to a step 204 of flowchart 200 in FIG. 2.

At step 304, a second keyboard input event is interpreted as an action input, the second keyboard input event being subsequent to the first keyboard input event. For example, keyboard logic 120 may operate to obtain input data from keyboard 102 via driver 118 of FIG. 1. As discussed above, input data from keyboard 102 may include, among other things, key codes that correspond to keystrokes triggered by a user. With the second keyboard input event being subsequent to the first keyboard input event, the key code(s) for the second keyboard input event may be buffered and/or transmitted to computing device 104 subsequent to the first key code(s) that correspond to the first keyboard input event.

The second keyboard input event may be a key press or a key release of a second key. Keyboard 102 may interpret the second keyboard input event as an action input using stored information (e.g., a lookup table) or information obtained from another source, such as keyboard 102 or from a database. Such action input triggers operations, changes a context, or navigates/changes a GUI in some manner. This step is similar to step 208 of flowchart 200 in FIG. 2.

At step 306, an elapsed time between the first keyboard input event and the second keyboard input event is determined. Keyboard logic 120 may determine the elapsed time between the first and second keyboard input events by analyzing time stamps of the first and second keyboard input events. The time stamps may be any combination of a key press event and a key release event of the first and second keystrokes. For example, the elapsed time may be determined as a difference between the key press/release for the first keystroke and the key press/release for the second keystroke. In another example, the elapsed time may be determined as a difference between the key release/press for the first keystroke and the key press/release of the second keystroke. How the elapsed time is determined, particularly which time stamp is used, may be based on information such as the positions of the keys relative to each other, absolute positions of the keys (e.g., whether they may be typed with one or two hands by a touch typist), or keystroke pairings (e.g., a character input and character input pair or a character input and an action input pair, a character input and a punctuation input pair). A user who is touch typing may typically press down on a first key, press down on a second key, release the first key, and then release the second key. Thus, the keyboard input events maybe interleaved in time, and keyboard logic 120 may consider this along with other information to calculate the elapsed time.

At step 308, it is determined whether the second keyboard input event is a result of an unintentional user keystroke or keystrokes based at least on the elapsed time between the first keyboard input event and the second keyboard input event. In embodiments, the determination of whether the second keyboard input event is a result of an unintentional user keystroke or keystrokes may be based at least on the interpretation of the first keyboard input event as the character input, the interpretation of the second keyboard input event as the action input, in addition to the elapsed time between the first and second keyboard input events. For example, keyboard logic 120 of computing device 104 may determine whether the second keyboard input event is a result of an unintentional keystroke or keystrokes by the user based at least on interpreting that the first keyboard input event is a character input (step 302), interpreting that the second keyboard input event is an action input (step 304), and the elapsed time (step 306). Other information may also be used in the keystroke pattern analysis to determine intent of the user. A process of utilizing the elapsed time to make such a determination will be further described below in flowchart 400 of FIG. 4.

At step 310, based at least on determining that the second keyboard input event is unintentional, one of the following is performed: ignoring the second keyboard input event, or interpreting the second keyboard input event as something other than the action input. Keyboard logic 120 may determine/select a logical alternative to the second keyboard input in a manner discussed above in reference to step 218 of FIG. 2. The alternatives may be other character or action inputs. In some embodiments, the interpretation of the second keyboard input event as something other than the action input may take place immediately after the second keyboard input. In other embodiments, the interpretation may be deferred for keyboard logic 120 to obtain further information, such as subsequent keystrokes.

Alternatively, keyboard logic 120 may just ignore or reject the second keyboard input. For example, keyboard logic 120 may simply ignore and/or reject the second keyboard input to simplify the mitigation process and/or to accommodate a user preference, for example.

Figure 4:
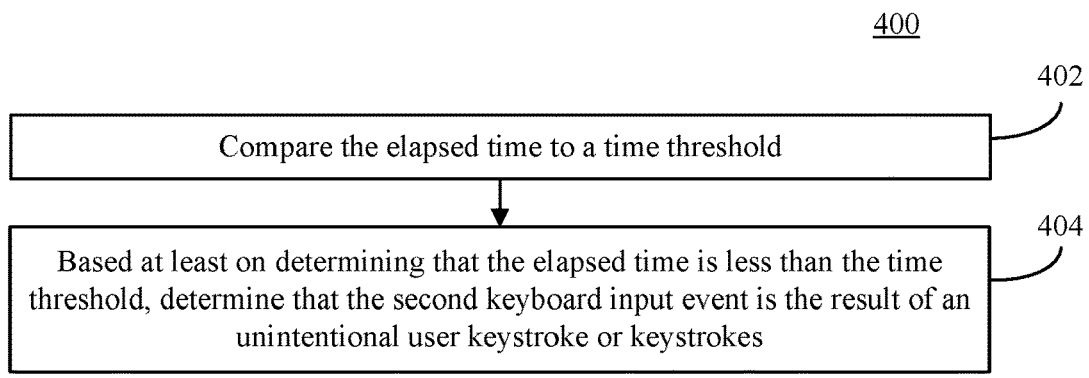
FIG. 4 depicts a flowchart of a method for determining whether a keyboard input event is a result of an unintentional user keystroke or keystrokes based on an elapsed time, according to an example embodiment.

FIG. 4 shows a flowchart 400 of a method for determining whether a keyboard input event is a result of an unintentional user keystroke or keystrokes, according to an example embodiment. The method of flowchart may be executed, for example, after the elapsed time has been determined in step 306 of flowchart 300, in order to determine whether the second keyboard input event is a result of an unintentional user keystroke or keystrokes. The method of flowchart 400 will now be described with continued reference to various components of system 100 of FIG. 1. For example, the steps of flowchart 400 may be performed by keyboard logic 120 of computing device 104.

Flowchart 400 begins at step 402, which compares the elapsed time to a time threshold. The time threshold may be one that is generally applied to all users or may instead be determined on a user-by-user basis. For example, keyboard logic 120 may determine the time threshold based on any of a typing speed of a user, information from a user profile, a typing style of a user during a typing session, or other information. As another example, keyboard logic 120 may determine the time threshold based on an exponential weighted moving average of a typing speed of a user that includes a weighted combination of a historical average and the latest sample taken. The historical average may be given more weight in some embodiments. Accordingly, the time threshold may be different for each user. For example, keyboard logic 120 may use a lower time threshold for a fast typist and a higher time threshold for a slow typist. In addition, the time threshold may be different for different keys or different key combinations. For example, keys that are close together may have a lower time threshold than keys that are physically farther apart.

At step 404, based at least on determining that the elapsed time is less than the time threshold, it is determined that the second keyboard input event is the result of an unintentional user keystroke or keystrokes. For example, when the elapsed time is determined to be less than the time threshold, keyboard logic 120 may determine that the second keyboard input event is the result of an unintentional user keystroke or keystrokes. It may be easier and faster for a user to touch type a series of characters (e.g., letters and numbers). However, the user may need some time to break this flow and to intentionally trigger an operation brought about by pressing an action key or an action key combination. Thus, it is unlikely for that user to type a series of characters and also to trigger an action or action key combination at the same typing speed and/or in the same flow. When the elapsed time between a character keyboard input and an action keyboard input is less than the time threshold then it may be unlikely that the action keyboard input is intentional. In this case, keyboard 120 may determine that the action keyboard input is the result of an unintentional user key stroke or keystrokes. Furthermore, keyboard 120 may determine that the action keyboard input is the result of an intentional user key stroke or keystrokes if the elapsed time is determined to be equal to or more than the time threshold.

Figure 5:
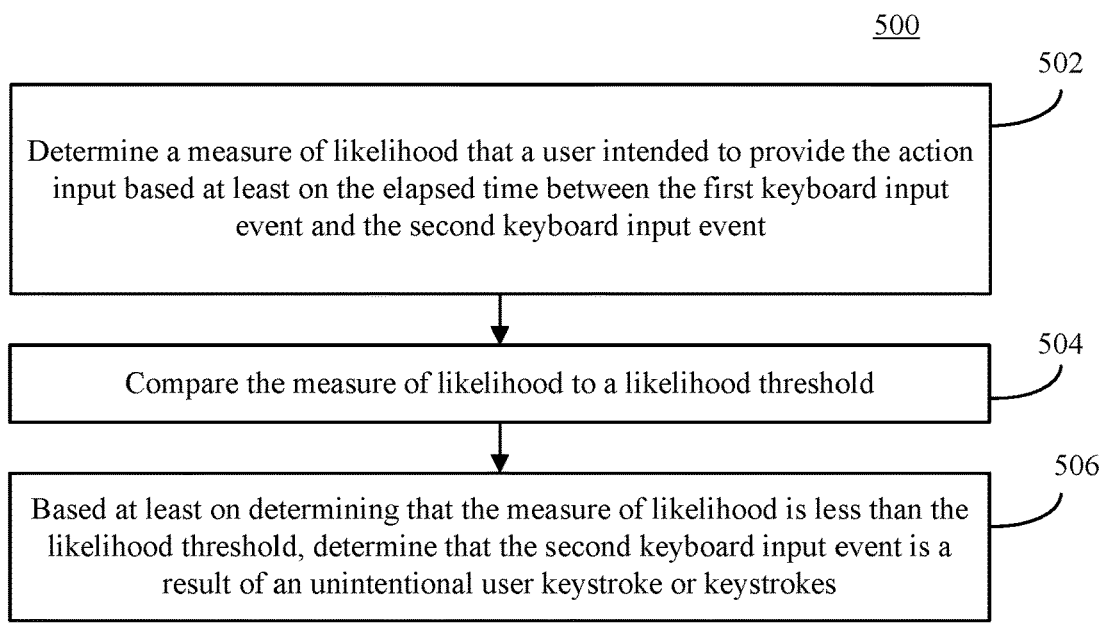
FIG. 5 depicts a flowchart of a method for determining whether a keyboard input event is a result of an unintentional user keystroke or keystrokes based on a measure of likelihood, according to another example embodiment.

As mentioned above, the determining of whether a keyboard input event is a result of an unintentional user keystroke or keystrokes may be based on a number of factors, one of which may be a measure of likelihood. This process will be described in reference to FIG. 5. FIG. 5 depicts a flowchart 500 of a method for mitigating unintentional triggering of action keys or action key combinations on a keyboard, according to an example embodiment. The method of flowchart 500 will now be described with continued reference to various components of system 100 of FIG. 1. For example, the steps of flowchart 500 may be performed by keyboard logic 120 of computing device 104. However, the method is not limited to that embodiment.

As shown in FIG. 5, the method of flowchart 500 begins at step 502, a measure of likelihood that a user intended to provide the action input is determined based at least on the elapsed time between the first keyboard input event and the second keyboard input event. The measure of likelihood may be a probability that a user might strike a particular key at the current typing speed. Thus, the measure of likelihood may also be determined based on the interpretation of the first keyboard input event as the character input, the interpretation of the second keyboard input as the action input, and the elapsed time between the first keyboard input event and the second keyboard input event. The measure of likelihood may be determined based on information in addition to the elapsed time, such as previous keystrokes, subsequent keystrokes, current context, user information such as typing speed or typing style, linguistic rules and style, language model, functional nature and adjacency of keys surrounding a particular key or relating to a key combination, etc. Other information and statistics may also be used to determine the measure of likelihood, such as a running average of collected information (e.g., user typing speed) that includes some combination of a historical average and a latest sample taken. The measure of likelihood may be a value or set of values. When multiple values are associated with a measure of likelihood, an average or some other function of the multiple values may be used in determining the final measure likelihood. Keyboard logic 120 may determine a measure of likelihood that a user intended to provide the action input based on any of the above information, individually or in combination. For example, in English, it may be logical for a user to type a comma after typing the word PAST. However, it is unlikely for that same user to type a comma after typing PAS, and thus if a comma keystroke is sensed here, then keyboard logic 120 may interpret such comma as being unintentional and may dispense with it accordingly. As another example, if a user is in the middle of typing a word, it is more likely that the user would want to type a punctuation key (e.g., the hyphen key) rather than an action key (e.g., the Caps Lock key or Windows key). Any of the above information may be used by keyboard logic 120 in determining the measure likelihood.

At step 504, the measure of likelihood is compared to a likelihood threshold. Keyboard logic 120 may compare the measure of likelihood determined in step 502 to a likelihood threshold. The likelihood threshold may be a value or set of values that correspond to different categories of information. Additionally, the measure of likelihood may be a global measure or a user-specific measure. The likelihood threshold may be a general or default likelihood threshold, whereas the user-specific likelihood threshold may account for user information, such as average typing speed, typing style, etc. Thus, the likelihood threshold for a specific user may be more accurate and/or preferred when available. Keyboard logic 120 may compare the determined measure of likelihood to the likelihood threshold, either global or user-specific, by determining whether the measure of likelihood is greater than, less than, or equal to the likelihood threshold.

At step 506, based at least on determining that the measure of likelihood is less than the likelihood threshold, it is determined that the second keyboard input event is a result of an unintentional user keystroke or keystrokes. Keyboard logic 120 may determine that the second physical keyboard input event is a result of an unintentional user keystroke or keystrokes by considering the measure of likelihood which takes into account a variety of information, such as the elapsed time between consecutive keystrokes. If the measure of likelihood is determined to be less than the likelihood threshold, then the second keyboard input event is determined to be a result of an unintentional user keystroke or keystrokes. If the measure of likelihood is determined to be equal to or greater than the likelihood threshold, then the second keyboard input event is determined to be a result of an intentional user keystroke or keystrokes.

Figure 6:
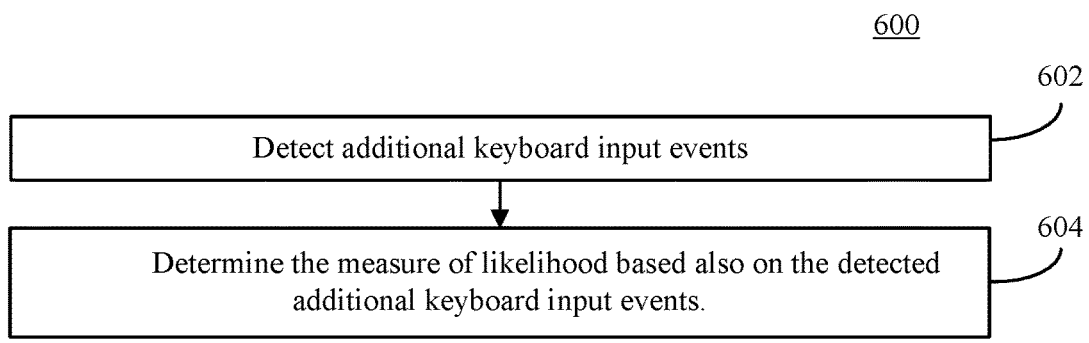
FIG. 6 depicts a flowchart of a method for determining a measure of likelihood, according to an example embodiment.

The measure of likelihood may be determined in various ways, one of which is described in FIG. 6. FIG. 6 shows a flowchart 600 for determining a measure of likelihood. The method of flowchart 600 will now be described with continued reference to various components of system 100 of FIG. 1. For example, the steps of flowchart 600 may be performed by keyboard logic 120 of computing device 104. However, the method is not limited to that embodiment. Flowchart 600 begins at step 602, in which additional keyboard input events are detected. Additional keyboard input events may be keyboard input events that occur before the first keyboard input event and second keyboard input event referred to in flowchart 300 or keyboard input events that occur after the first keyboard input event and second keyboard input event referred to in flowchart 300. For example, the measure of likelihood may account for keystrokes that occur before a particular keystroke corresponding to the first keyboard input event. In addition, instead of determining the measure of likelihood immediately after the second keyboard input event, keyboard logic 120 may delay that determination to consider one or more keystrokes that occur after the second keyboard input event to obtain more data to perform the determination. At step 604, the measure of likelihood is determined based also on the detected additional keyboard input events. Keyboard logic 120 may detect and determine the measure of likelihood based on the additional keyboard input events in addition to other information.

The mitigation of unintentional triggering of action key or action key combinations described herein allows for overriding measures that a user can initiate. For example, in knowing that a particular instance (e.g., an action key combination) might activate the mitigation process, a user might want to override or otherwise disable the mitigation process for that particular instance when trying to type the particular action key combination as shown in FIG. 7. FIG. 7 depicts a flowchart 700 of a method for disabling mitigation measures, according to an example embodiment. The method of flowchart 700 will now be described with continued reference to various components of system 100 of FIG. 1. For example, the steps of flowchart 700 may be performed by keyboard logic 120 of computing device 104. However, the method is not limited to that embodiment.

Flowchart 700 begins at step 702, the second keyboard input event is determined not to be a result of an unintentional user keystroke or keystrokes in response to detecting a third keyboard input event that is subsequent to the second physical keyboard input event and is also interpreted as the action input, or determining that a duration of the second keyboard input event exceeds a predetermined amount of time. For example, keyboard logic 120 may interpret the third keyboard event as the same action input that corresponds to the second keyboard event and initiate an override to accept the second keyboard input event as intentional. In this case, the first key press that corresponds to the second keyboard input event may first be interpreted as unintentional. However, upon detecting a repeated key press (i.e., the third keyboard input event) that also corresponds to the second keyboard input event, keyboard logic 120 may negate the first interpretation and/or simply ignore it. For example, if the user wants to type a comma right after typing the letters PAS, the user might type PAS and then quickly type a comma after. However, because PAS is not a recognizable word in English, keyboard logic 120 might apply mitigation measures and ignore the comma or replace the comma and/or the word PAS with something else in an autocorrect operation. To obtain the desired result, a user may apply an override condition here and press the comma key twice after typing PAS, to temporarily suspend the mitigation process.

Alternatively, keyboard logic 120 may determine that the duration of the second keyboard input event exceeds a predetermined amount of time and initiate an override to accept the second keyboard input event as intentional. Accordingly, a user may press and hold a key or key combination for longer than a predetermined amount of time to initiate this override. The predetermined amount of time may be configured by the user or the system, and may be any reasonable amount of time that is longer than typically needed for a normal keyboard input event to be sensed by keyboard 102. To continue with the example above, the user may apply this override condition by pressing and holding the comma key for some time (e.g., 100 milliseconds) after typing the letters PAS to suspend the mitigation process for the third keyboard input instance. While two different override conditions are described here, other conditions may be utilized even though they are not specifically mentioned.

While FIG. 7 is directed to overriding the mitigation process for a specific input instance, a temporary disabling of the mitigation process, a user may also activate a longer or more expansive disabling of the mitigation process, as shown in FIG. 8. FIG. 8 depicts a flowchart 800 of a method for disabling mitigation measures, according to an example embodiment. The method of flowchart 800 will now be described with continued reference to various components of system 100 of FIG. 1. For example, the steps of flowchart 800 may be performed by keyboard logic 120 of computing device 104. However, the method is not limited to that embodiment.

Flowchart 800 begins at step 802, in which a subsequent performance of at least the performing step of flowchart 300 (step 310) is disabled based at least on a user input context, or determining that a typing speed of a user is less than a predetermined speed. As may be inferred from the preceding sentence, this step may be performed after some of the steps of FIG. 3, for example, steps 306, 308 and 310, have already been performed. In example embodiments, other steps, such as the determining steps of FIG. 3 (e.g., steps 306 and 308) may also be disabled. Keyboard logic 120 may disable the mitigation process and not perform the performing step if certain conditions apply or when initiated by the user. The disabling signal may be triggered by the user, for example, by selecting an element in a graphical user interface (e.g., clicking a button, selecting a text) of computing device 104, or pressing a button, a special key, or a special key combination on keyboard 102. Alternatively, keyboard logic 120 may determine, based on the user input context, user information (e.g., a user typing speed) or any other information, that mitigation measures may not be necessary or not useful to the user. In this case, keyboard logic 120 may automatically disable the mitigation process by not performing the performing step (e.g., step 310). For example, if the user input context is a password field, which may accept or require a series of letters, numbers and punctuation marks that is not typically found in a natural language or other forms of language, it may not be useful to perform the mitigation process in this case. As another example, if a user is typing very slowly, the elapsed time between consecutive keystrokes may not be very meaningful to be used in the mitigation process. Moreover, the user who is typing very slowly is more likely to make deliberate keystrokes instead of accidental keystrokes.

C. Example Keyboard Embodiment

FIG. 9 is a block diagram of a keyboard 900 that is an input device capable of mitigating unintentional triggering of action keys or action key combinations. As shown in FIG. 9, keyboard 900 includes a memory 902, a plurality of keys 904, a plurality of sensors 906, and a processing unit 908. Keyboard 900 is described as follows.

The plurality of keys 904 include user-actuatable components such as buttons or keys with marks engraved, printed or presented on them, such as letters (e.g., A-Z), numbers (e.g., 0-9), punctuation marks (e.g., a comma, a period, a hyphen, brackets, slashes), symbols (e.g., @, #, $) and specialty keys that may be associated with actions or act to modify other keys (e.g., Caps Lock, Fn, Shift, arrow keys). Each key may be associated with a key code or scan code based on its position on keyboard 102. For example, the pressing of the Esc key may produce key code 01, and the releasing of the Esc key may produce key code 81. If the Esc key is pressed twice, key code 01 may be registered twice, for example. Key codes sensed by keyboard 900 may be transmitted to a computing device as sensed. The key codes may also be translated, via a lookup table for example, to a set of output key codes (e.g., Universal Serial Bus codes) before being transmitted. The key codes may be saved at keyboard 900 before being transmitted as a series of key codes in a data stream. Keyboard 900 may also be repeatedly polled to detect state changes of the keys as keyboard input events.

Sensors 906 are components that sense the pressing or releasing of keys 904. Thus, sensors 906 may have a one-to-one correspondence with keys 904. Sensors 906 may be implemented with Hall effect sensors and magnets, photo sensors and light-emitting devices, capacitor pads, or various other types of switches such as dome-switch, scissor-switch, mechanical-switch, etc. Any actuation of keys 904 may be sensed by sensors 906, for example, the pressing, repeated pressing, holding or releasing of keys 904, to generate one or more key codes or scan codes. For example, the pressing of the forward slash may generate key code e0 35 and the releasing of it may generate e0 b5. If a key is pressed multiple times, the key code for it may be repeated. If multiple keys are pressed simultaneously or in sequence, a series of key codes may be generated for the key combination.

Processing unit 908 represents one or more processing circuits, which may comprise one or more microprocessors, each of which may include one or more CPUs, or microprocessor cores. Processing unit 908 may also comprise a microcontroller, application-specific integrated circuit (ASIC), and/or field-programmable gate array (FPGA). Processing unit 908 may operate in a well-known manner to execute computer programs or computer program logic. The execution of such computer programs causes processing unit 908 to perform operations, including operations that will be described herein. Each component of keyboard 900, such as sensors 906 and memory 906, may be connected to processing unit 908 via one or more suitable interfaces.

Memory 902 comprises one or more volatile memory devices and/or nonvolatile memory devices. The memory devices of memory 902 may be connected to the processing circuits of processing unit 908. Memory 902 stores software components as well as data, such as keycodes or lookup tables. Memory 902 may also store computer program logic, such as keyboard logic 901 that includes instructions that may be executed by the processing circuits of processing unit 908 to perform operations. Such operations include sensing, via sensors 906, a pressing of one or more first keys in the plurality of keys 904, interpreting the pressing of the one or more first keys as a character input, sensing, via sensors 906, a pressing of one or more second keys in the plurality of keys 904, and interpreting the pressing of the one or more second keys as an action input. The operations further include determining an elapsed time between the pressing of the one or more first keys and the pressing of the one or more second keys, and determining that the pressing of the one or more second keys is unintentional based at least on the interpretation of the pressing of the one or more second keys as the action input, and the elapsed time between the pressing of the one or more first keys and the pressing of the one or more second keys. Based at least on determining that the pressing of the one or more second keys is unintentional, the operations further include performing one of: ignoring the pressing of the one or more first keys, or interpreting the pressing of the one or more second keys as something other than the action input, which includes interpreting the pressing of the one or more second keys as a different action input or interpreting the pressing of the one or more second keys as another character input.

Keyboard logic 910 is similar or the same as keyboard logic 120 shown in FIG. 1. Thus, for the sake of brevity keyboard logic 910 is not further described here. According to this embodiment, the mitigation of unintentional triggering of action keys or action key combinations may be wholly performed by keyboard 900. Therefore, instead of transmitting input data to be further processed by a computing device, keyboard 900 may process the input data, key codes for example, using processing unit 908 and only transmit processed data (e.g., rendering commands to a graphic user interface) to a computing device associated with keyboard 900 when needed.

III. Example Computer System Implementation

Figure 10:
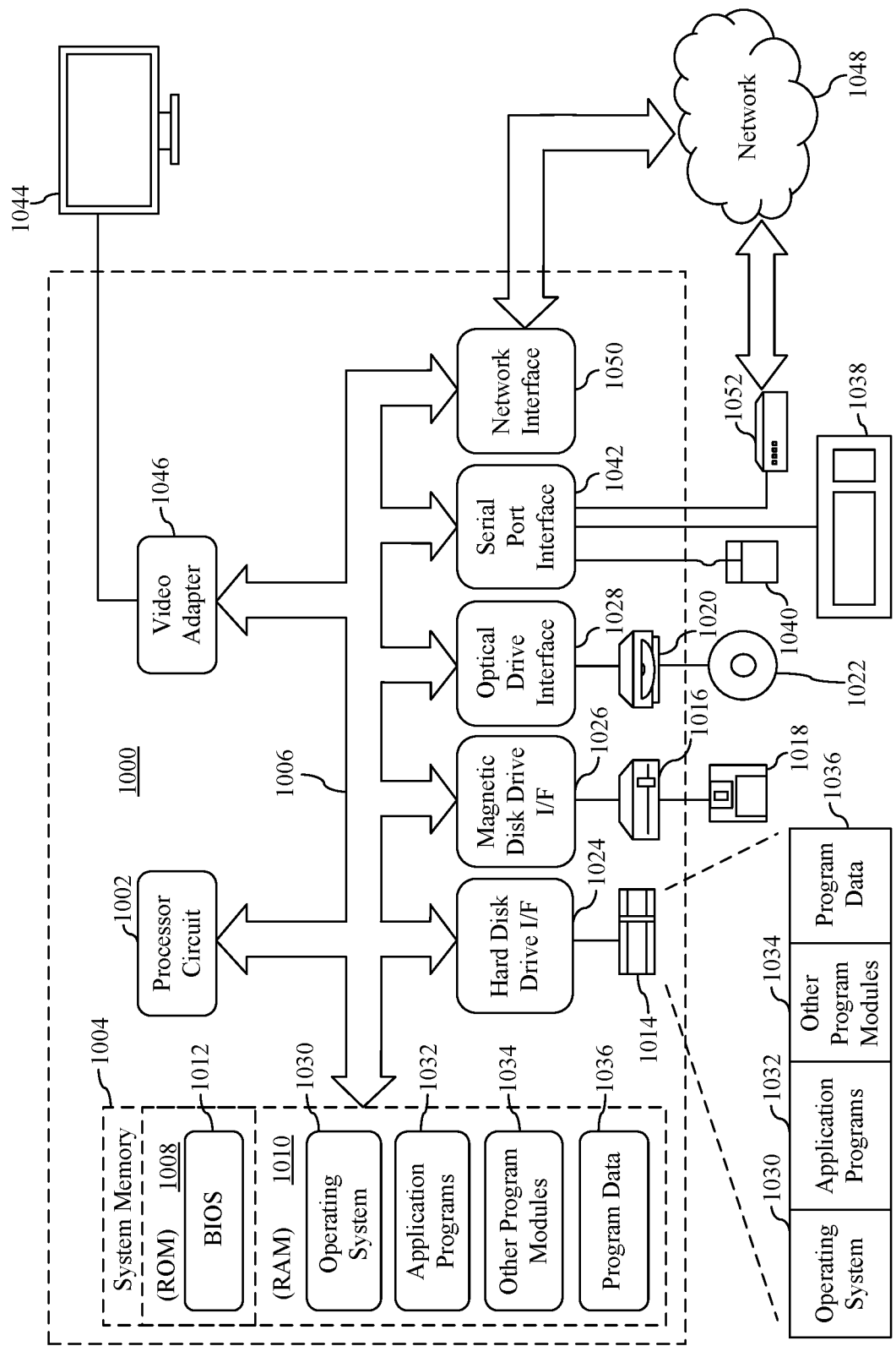
FIG. 10 is a block diagram of an example processor-based computer system that may be used to implement various embodiments.

FIG. 10 depicts an example processor-based computer system 1000 that may be used to implement various embodiments described herein. For example, system 1000 may be used to implement computing device 104 as described above in reference to FIG. 1. System 1000 may also be used to implement any of the steps of any of the flowcharts of FIGS. 2-8 as described above. The description of system 1000 provided herein is provided for purposes of illustration, and is not intended to be limiting. Embodiments may be implemented in further types of computer systems, as would be known to persons skilled in the relevant art(s).

As shown in FIG. 10, system 1000 includes a processing unit 1002, a system memory 1004, and a bus 1006 that couples various system components including system memory 1004 to processing unit 1002. Processing unit 1002 may comprise one or more circuits, microprocessors or microprocessor cores. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

System 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, BLU-RAY™ disk or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1030, one or more application programs 1032, other program modules 1034, and program data 1036. In accordance with various embodiments, the program modules may include computer program logic that is executable by processing unit 1002 to perform any or all of the functions and features of computing device 104 as described above in reference to FIG. 1. The program modules may also include computer program logic that, when executed by processing unit 1002, causes processing unit 1002 to perform any of the steps of any of the flowcharts of FIGS. 2-8 as described above.

A user may enter commands and information into system 1000 through input devices such as a keyboard 1038 and a pointing device 1040 (e.g., a mouse). Other input devices (not shown) may include a microphone, joystick, game controller, scanner, or the like. In one embodiment, a touch screen is provided in conjunction with a display 1044 to allow a user to provide user input via the application of a touch (as by a finger or stylus for example) to one or more points on the touch screen. These and other input devices are often connected to processing unit 1002 through a serial port interface 1042 that is coupled to bus 1006, but may be connected by other interfaces, such as a parallel port, game port, or a universal serial bus (USB). Such interfaces may be wired or wireless interfaces.

Display 1044 is connected to bus 1006 via an interface, such as a video adapter 1046. In addition to display 1044, system 1000 may include other peripheral output devices (not shown) such as speakers and printers.

System 1000 is connected to a network 1048 (e.g., a local area network or wide area network such as the Internet) through a network interface 1050, a modem 1052, or other suitable means for establishing communications over the network. Modem 1052, which may be internal or external, is connected to bus 1006 via serial port interface 1042.

As used herein, the terms "computer program medium," "computer-readable medium," and "computer-readable storage medium" are used to generally refer to memory devices or storage structures such as the hard disk associated with hard disk drive 1014, removable magnetic disk 1018, removable optical disk 1022, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050, serial port interface 1042, or any other interface type. Such computer programs, when executed or loaded by an application, enable system 1000 to implement features of embodiments discussed herein. Accordingly, such computer programs represent controllers of the system 1000. Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1000 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

IV. Additional Example Embodiments

A system is described herein. The system includes: one or more processing circuits; and one or more memory devices connected to the one or more processing circuits, the one or more memory devices storing instructions that are executable by the one or more processing circuits to perform operations, the operations including: interpreting a first physical keyboard input event as a character input; interpreting a second physical keyboard input event as an action input, the second physical keyboard input event being subsequent to the first keyboard input event; determining an elapsed time between the first physical keyboard input event and the second physical keyboard input event; determining whether the second physical keyboard input event is a result of an unintentional user keystroke or keystrokes based at least on the interpretation of the first physical keyboard input event as the character input, the interpretation of the second physical keyboard input event as the action input, and the elapsed time between the first physical keyboard input event and the second physical keyboard input event; and based at least on determining that the second physical keyboard input event is unintentional, performing one of: ignoring the second physical keyboard input event; or interpreting the second physical keyboard input event as something other than the action input.

In one embodiment of the foregoing system, the interpreting the second physical keyboard input event as something other than the action input comprises: interpreting the second physical keyboard input event as a different action input; or interpreting the second physical keyboard input event as another character input.

In another embodiment of the foregoing system, the determining that the second physical keyboard input event is a result of an unintentional user keystroke or keystrokes comprises: comparing the elapsed time to a time threshold; and based at least on determining that the elapsed time is less than the time threshold, determining that the second physical keyboard input event is the result of an unintentional user keystroke or keystrokes.

In yet another embodiment of the foregoing system, the time threshold is determined on a user-by-user basis.

In yet another embodiment of the foregoing system, the time threshold is different for different keys or key combinations.

In still another embodiment of the foregoing system, the determining that the second physical keyboard input event is a result of an unintentional user keystroke or keystrokes comprises determining a measure of likelihood that a user intended to provide the action input based at least on the interpretation of the first physical keyboard input event as the character input, the interpretation of the second physical keyboard input event as the action input, and the elapsed time between the first physical keyboard input event and the second physical keyboard input event; comparing the measure of likelihood to a likelihood threshold; and based at least on determining that the measure of likelihood is less than the likelihood threshold, determining that the second physical keyboard input event is a result of an unintentional user keystroke or keystrokes.

In yet another embodiment of the foregoing method, the determining the measure of likelihood comprises: detecting additional physical keyboard input events; and determining the measure of likelihood based also on the detected additional physical keyboard input events.

In a further embodiment of the foregoing system, the operations further includes determining that the second physical keyboard input event is not a result of an unintentional user keystroke or keystrokes in response to: detecting a third physical keyboard input event that is subsequent to the second physical keyboard input event and is also interpreted as the action input; or determining that a duration of the second physical keyboard input event exceeds a predetermined amount of time.

In a still further embodiment of the foregoing system, the operations further include disabling a subsequent performance of at least the performing step based at least on: a user input context; or determining that a typing speed of a user is less than a predetermined speed.

A method is also described herein. The method includes interpreting a first keyboard input event as a character input; interpreting a second keyboard input event as an action input, the second keyboard input event being subsequent to the first keyboard input event; determining an elapsed time between the first keyboard input event and the second keyboard input event; determining whether the second keyboard input event is a result of an unintentional user keystroke or keystrokes based at least on the interpretation of the first keyboard input event as the character input, the interpretation of the second keyboard input event as the action input, and the elapsed time between the first keyboard input event and the second keyboard input event; and based at least on determining that the second keyboard input event is unintentional, performing one of: ignoring the second keyboard input event; or interpreting the second keyboard input event as something other than the action input.

In one embodiment of the foregoing method, the interpreting the second keyboard input event as something other than the action input comprises: interpreting the second keyboard input event as a different action input; or interpreting the second keyboard input event as another character input.

In another embodiment of the foregoing method, the determining that the second keyboard input event is a result of an unintentional user keystroke or keystrokes comprises: comparing the elapsed time to a time threshold; and based at least on determining that the elapsed time is less than the time threshold, determining that the second keyboard input event is the result of an unintentional user keystroke or keystrokes.

In yet another embodiment of the foregoing method, the time threshold is determined on a user-by-user basis.

In yet another embodiment of the foregoing method, the time threshold is different for different keys or key combinations.

In still another embodiment of the foregoing method, the determining that the second physical keyboard input event is a result of an unintentional user keystroke or keystrokes comprises determining a measure of likelihood that a user intended to provide the action input based at least on the interpretation of the first physical keyboard input event as the character input, the interpretation of the second physical keyboard input event as the action input, and the elapsed time between the first physical keyboard input event and the second physical keyboard input event; comparing the measure of likelihood to a likelihood threshold; and based at least on determining that the measure of likelihood is less than the likelihood threshold, determining that the second physical keyboard input event is a result of an unintentional user keystroke or keystrokes.

In yet another embodiment of the foregoing method, the determining the measure of likelihood comprises: detecting additional physical keyboard input events; and determining the measure of likelihood based also on the detected additional physical keyboard input events.

In a further embodiment of the foregoing method, the method further includes determining that the second keyboard input event is not a result of an unintentional user keystroke or keystrokes in response to: detecting a third keyboard input event that is subsequent to the second keyboard input event and is also interpreted as the action input; or determining that a duration of the second keyboard input event exceeds a predetermined amount of time.

In a still further embodiment of the foregoing method, the method further includes disabling a subsequent performance of at least the performing step based at least on: a user input context; or determining that a typing speed of a user is less than a predetermined speed.

A keyboard is also described herein. The keyboard includes a plurality of keys; one or more processing circuits; and one or more memory devices connected to the one or more processing circuits, the one or more memory devices storing instructions that are executable by the one or more processing circuits to perform operations, the operations comprising: sensing a pressing of one or more first keys in the plurality of keys; interpreting the pressing of the one or more first keys as a character input; sensing a pressing of one or more second keys in the plurality of keys; interpreting the pressing of the one or more second keys as an action input; determining an elapsed time between the pressing of the one or more first keys and the pressing of the one or more second keys; determining that the pressing of the one or more second keys is unintentional based at least on the interpretation of the pressing of the one or more first keys as the character input, the interpretation of the pressing of the one or more second keys as the action input, and the elapsed time between the pressing of the one or more first keys and the pressing of the one or more second keys; and based at least on determining that the pressing of the one or more second keys is unintentional, performing one of: ignoring the pressing of the one or more first keys; or interpreting the pressing of the one or more second keys as something other than the action input.

In one embodiment of the foregoing keyboard, the interpreting the pressing of the one or more second keys as something other than the action input comprises: interpreting the pressing of the one or more second keys as a different action input; or interpreting the pressing of the one or more second keys as another character input.

V. CONCLUSION

While various embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system, comprising:
one or more processing circuits; and
one or more memory devices connected to the one or more processing circuits, the one or more memory devices storing instructions that are executable by the one or more processing circuits to perform operations, the operations including:
interpreting a first physical keyboard input event as a character input;
interpreting a second physical keyboard input event as an action input that triggers an operation, changes a context, or navigates or changes a graphical user interface (GUI), the second physical keyboard input event being subsequent to the first keyboard input event;

in response to the interpreting the first physical keyboard input event as the character input and the interpreting the second physical keyboard input event as the action input:

determining an elapsed time between the first physical keyboard input event and the second physical keyboard input event;

determining whether the second physical keyboard input event is a result of an unintentional user keystroke or keystrokes based at least on the elapsed time between the first physical keyboard input event and the second physical keyboard input event; and based at least on determining that the second physical keyboard input event is unintentional, performing one of:

ignoring the second physical keyboard input event; or interpreting the second physical keyboard input event as something other than the action input.

2. The system of claim 1, wherein the interpreting the second physical keyboard input event as something other than the action input comprises:

interpreting the second physical keyboard input event as a different action input; or interpreting the second physical keyboard input event as another character input.

3. The system of claim 1, wherein the determining that the second physical keyboard input event is a result of an unintentional user keystroke or keystrokes based at least on the elapsed time between the first physical keyboard input event and the second physical keyboard input event comprises:

comparing the elapsed time to a time threshold; and based at least on determining that the elapsed time is less than the time threshold, determining that the second physical keyboard input event is the result of an unintentional user keystroke or keystrokes.

4. The system of claim 3, wherein the time threshold is determined on a user-by-user basis.

5. The system of claim 3, wherein the time threshold is different for different keys or key combinations.

6. The system of claim 1, wherein the determining that the second physical keyboard input event is a result of an unintentional user keystroke or keystrokes comprises:

determining a measure of likelihood that a user intended to provide the action input based at least on the elapsed time between the first physical keyboard input event and the second physical keyboard input event;

comparing the measure of likelihood to a likelihood threshold; and based at least on determining that the measure of likelihood is less than the likelihood threshold, determining that the second physical keyboard input event is a result of an unintentional user keystroke or keystrokes.

7. The system of claim 6, wherein the determining the measure of likelihood comprises:

detecting additional physical keyboard input events; and determining the measure of likelihood based also on the detected additional physical keyboard input events.

8. The system of claim 1, wherein the operations further comprise:

determining that the second physical keyboard input event is not a result of an unintentional user keystroke or keystrokes in response to:

detecting a third physical keyboard input event that is subsequent to the second physical keyboard input event and is also interpreted as the action input; or determining that a duration of the second physical keyboard input event exceeds a predetermined amount of time.

9. The system of claim 1, wherein the operations further comprise:

disabling a subsequent performance of at least the performing step based at least on:

a user input context; or determining that a typing speed of a user is less than a predetermined speed.

10. A method, comprising:

interpreting a first keyboard input event as a character input;

interpreting a second keyboard input event as an action input that triggers an operation, changes a context, or navigates or changes a graphical user interface (GUI), the second keyboard input event being subsequent to the first keyboard input event;

in response to the interpreting the first physical keyboard input event as the character input and the interpreting the second physical keyboard input event as the action input:

determining an elapsed time between the first keyboard input event and the second keyboard input event;

determining whether the second keyboard input event is a result of an unintentional user keystroke or keystrokes based at least on the elapsed time between the first keyboard input event and the second keyboard input event; and based at least on determining that the second keyboard input event is unintentional, performing one of:

ignoring the second keyboard input event; or interpreting the second keyboard input event as something other than the action input.

11. The method of claim 10, wherein the interpreting the second keyboard input event as something other than the action input comprises:

interpreting the second keyboard input event as a different action input; or interpreting the second keyboard input event as another character input.

12. The method of claim 10, wherein the determining that the second keyboard input event is a result of an unintentional user keystroke or keystrokes based at least on the elapsed time between the first keyboard input event and the second keyboard input event comprises:

comparing the elapsed time to a time threshold; and based at least on determining that the elapsed time is less than the time threshold, determining that the second keyboard input event is the result of an unintentional user keystroke or keystrokes.

13. The method of claim 12, wherein the time threshold is determined on a user-by-user basis.

14. The method of claim 12, wherein the time threshold is different for different keys or key combinations.

15. The method of claim 10, wherein the determining that the second keyboard input event is a result of an unintentional user keystroke or keystrokes comprises:

determining a measure of likelihood that a user intended to provide the action input based at least on the elapsed time between the first keyboard input event and the second keyboard input event;

comparing the measure of likelihood to a likelihood threshold; and based at least on determining that the measure of likelihood is less than the likelihood threshold, determining that the second keyboard input event is a result of an unintentional user keystroke or keystrokes.

16. The method of claim 15, wherein the determining a measure of likelihood that a user intended to provide the action input comprises:
    detecting additional keyboard input events; and
    determining the measure of likelihood based also on the detected additional keyboard input events.

17. The method of claim 10, further comprising:
    determining that the second keyboard input event is not a result of an unintentional user keystroke or keystrokes in response to:
        detecting a third keyboard input event that is subsequent to the second keyboard input event and is also interpreted as the action input; or
        determining that a duration of the second keyboard input event exceeds a predetermined amount of time.

18. The method of claim 10, further comprising:
    disabling a subsequent performance of at least the performing steps based at least on:
        a user input context; or
        determining that a typing speed of a user is less than a predetermined speed.

19. A keyboard, comprising:
    a plurality of keys;
    one or more processing circuits; and
    one or more memory devices connected to the one or more processing circuits, the one or more memory devices storing instructions that are executable by the one or more processing circuits to perform operations, the operations comprising:
        sensing a pressing of one or more first keys in the plurality of keys;
        interpreting the pressing of the one or more first keys as a character input;
        sensing a pressing of one or more second keys in the plurality of keys;
        interpreting the pressing of the one or more second keys as an action input that triggers an operation, changes a context, or navigates or changes a graphical user interface (GUI);
        in response to the interpreting the pressing of the one or more first keys as a character input and the interpreting the pressing of the one or more second keys as an action input:
            determining an elapsed time between the pressing of the one or more first keys and the pressing of the one or more second keys;
            determining that the pressing of the one or more second keys is unintentional based at least on the elapsed time between the pressing of the one or more first keys and the pressing of the one or more second keys; and
            based at least on determining that the pressing of the one or more second keys is unintentional, performing one of:
                ignoring the pressing of the one or more first keys; or
                interpreting the pressing of the one or more second keys as something other than the action input.

20. The keyboard of claim 19, wherein the interpreting the pressing of the one or more second keys as something other than the action input comprises:
    interpreting the pressing of the one or more second keys as a different action input; or
    interpreting the pressing of the one or more second keys as another character input.

* * * * *